United States Patent [19]

Stampone

[11] 3,944,296
[45] Mar. 16, 1976

[54] TRACK PAD FOR ASPHALT PAVING MACHINE

[75] Inventor: Peter A. Stampone, Livingston, N.J.
[73] Assignee: Tuff Manufacturing Co., Inc., Saddle Brook, N.J.
[22] Filed: Mar. 12, 1975
[21] Appl. No.: 557,763

[52] U.S. Cl.................. 305/35 R; 305/38; 214/273; 305/10
[51] Int. Cl.². ........................................ B62D 55/22
[58] Field of Search .................. 305/35, 38, 37, 10; 264/273, 274, 275

[56] References Cited
UNITED STATES PATENTS

| | | | |
|---|---|---|---|
| 1,082,330 | 12/1913 | Holt | 305/35 R X |
| 2,335,872 | 12/1943 | Mitchell | 264/273 |
| 2,844,413 | 7/1958 | Gates | 305/38 |
| 2,917,347 | 12/1959 | Reuter | 305/38 |
| 3,261,646 | 7/1966 | Pax | 305/35 R |

Primary Examiner—Philip Goodman
Attorney, Agent, or Firm—Bain, Gilfillan & Rhodes

[57] ABSTRACT

A track pad for the support and propulsion of track propelled vehicles (e.g. asphalt paving machines) comprising a support plate having a longitudinal axis which is greater than its transverse axis, a coating of heavy duty polymer (e.g. a thermoplastic urethane elastomer resin) which substantially encapsulates the support plate, and a means for securing the track pad to the track. The support plate is provided with suitable openings to accommodate the positioning therethrough of a securing means (e.g. flat head carriage bolts), said securing means for removably attaching the track pad to the track. The track pad of this invention is manufactured by pre-assembly of the securing means and the support plate whereafter the pad material is injection molded such as to substantially encapsulate the support plate.

14 Claims, 9 Drawing Figures

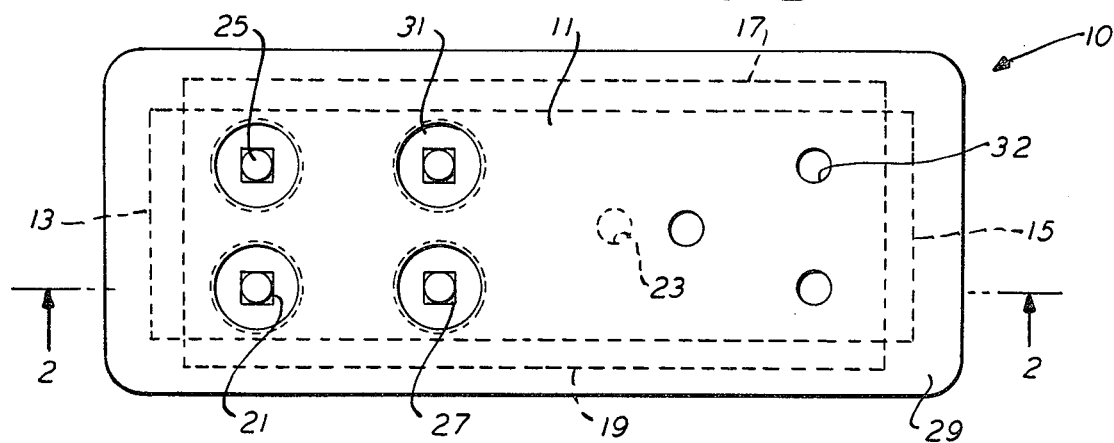
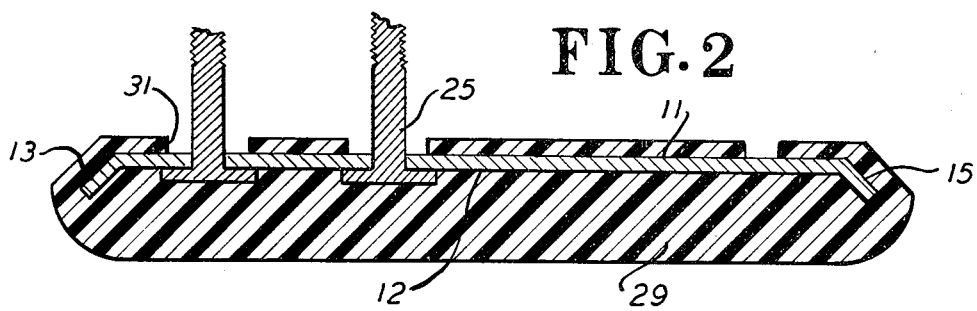
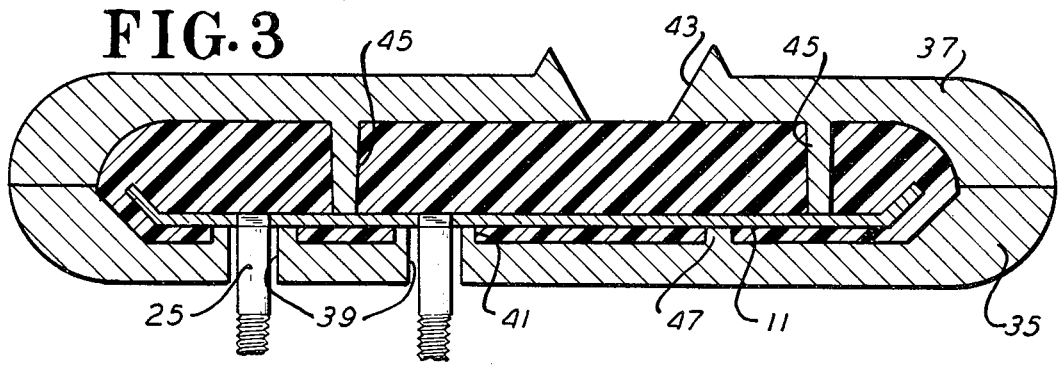
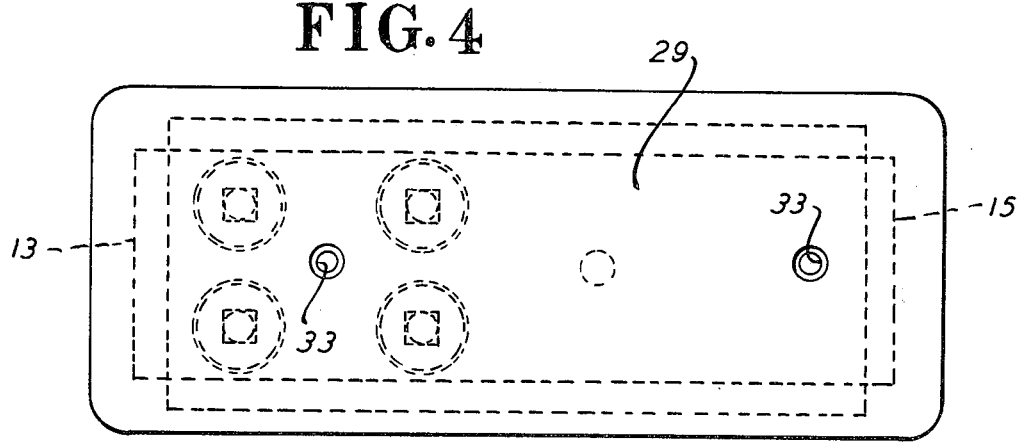

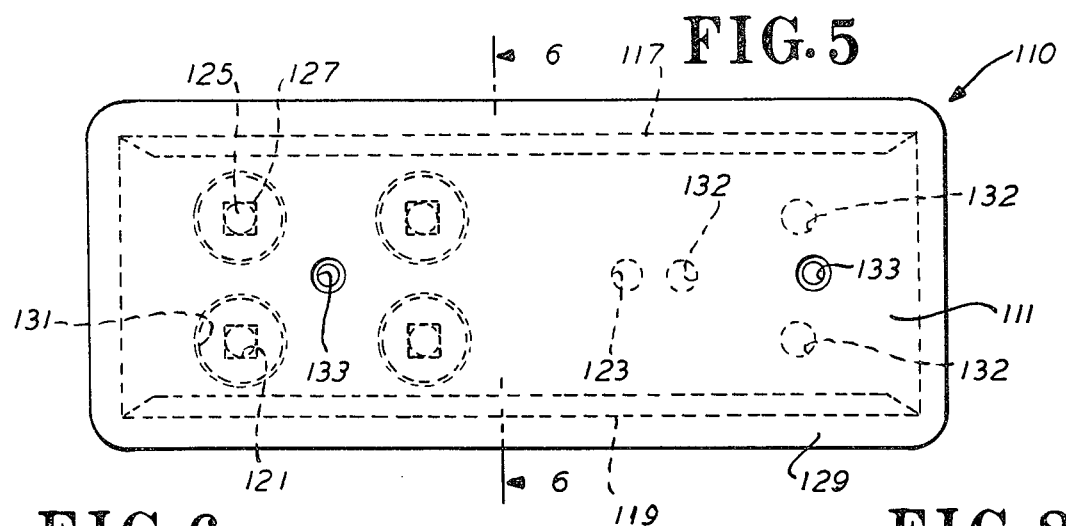
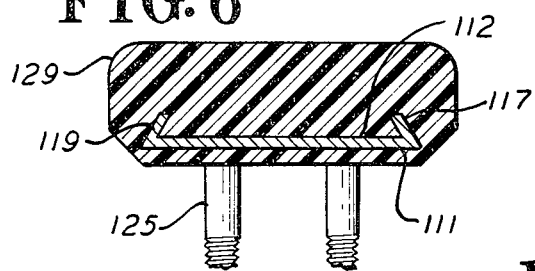
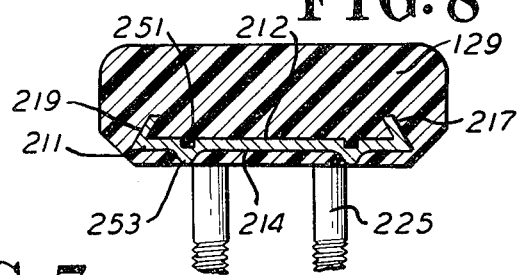
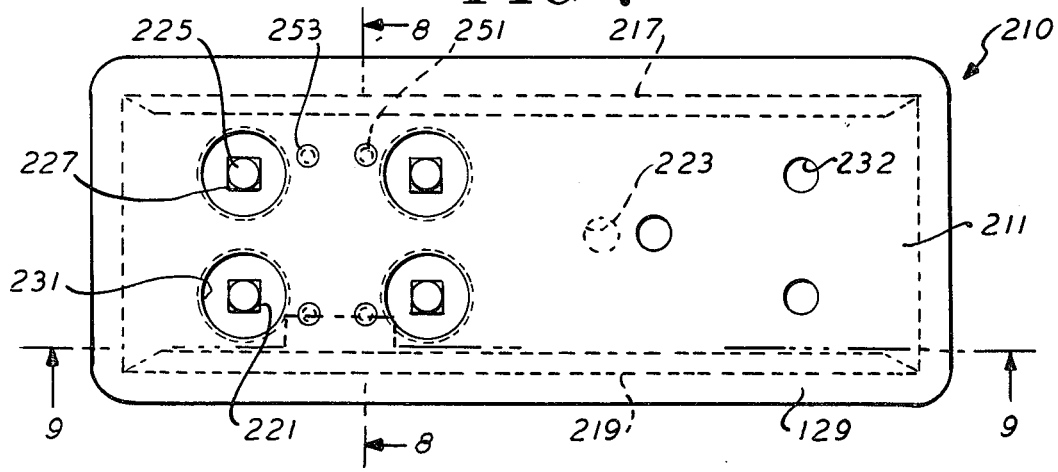
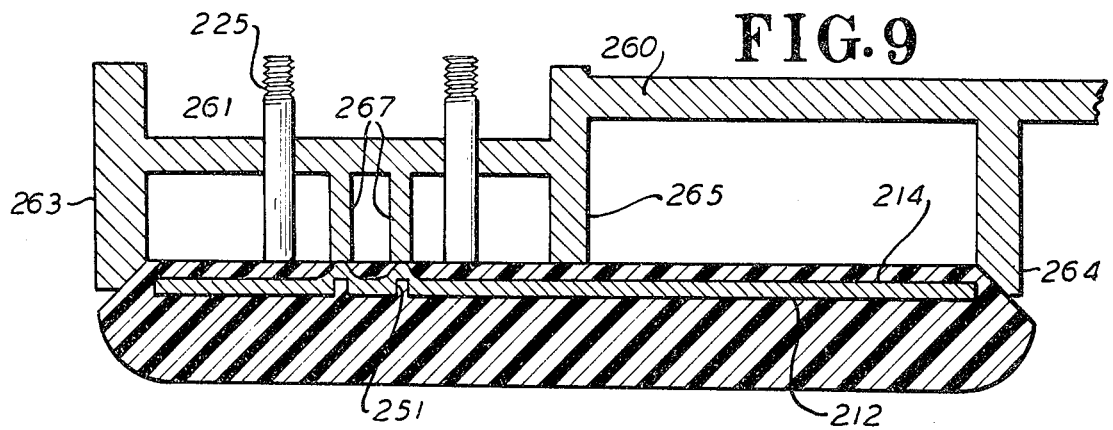

TRACK PAD FOR ASPHALT PAVING MACHINE

BACKGROUND

This invention relates to vehicle support equipment. More particularly this invention relates to improved support structure for the tracks of vehicles which are supported by tracks e.g. asphalt paving machines, cranes, bulldozers and the like.

One of the more vexing problems facing those who operate tracked vehicles, e.g. asphalt paving machines, is the rapid wear occurring to the track pads on such machines. In this regard a track pad is a structure which is secured removably to the drive track of a track supported vehicle and which provides the contact surface between the tracked vehicle and its supporting surface, e.g. a road, the earth, the rock bed of a quarry or the like. Typically such vehicles utilize a plurality of track pads, e.g. as many as two hundred and fifty such pads utilized on equipment such as asphalt paving machines.

A typical tracked vehicle, such as the asphalt paving machine with respect to which the invention is described, weighs several thousand pounds and is required to transmit both supporting and propelling forces between the equipment and the support surface. For example, in normal operation, a typical asphalt paving machine is positioned behind a truck which contains the asphalt. The paving machine not only transports itself during paving but also provides the power to push the truck thus insuring the paving machine of a continuous and uninterrupted engagement with the truck. Thus, in addition to supporting and propelling its own weight, the paving machine propels the truck and its load of asphalt, a weight of several tons. This type of operation produces extreme-load and frictional forces upon the track pads.

Known track pads presently in use comprise rubber pads secured to metal support elements. The rubber pad material is secured only to one side of the support element viz. the side on which the pad makes surface-to-surface- contact with the supporting medium e.g. the ground or road. Further, known support elements comprise planar plates and have no means of effectively gripping the pad material. As is recognized in the art, such pads have been incapable of withstanding the loads attendant to supporting and propelling of heavy tracked equipment and have failed, often within days of installation. The failure ordinarily takes the form of complete separation of the pad material from the structural support element because of the inability of the track pad to withstand the frictional (propelling) forces to which it is subjected. When this occurs there is loss of frictional engagement between the supporting surface and the track pad and the asphalt paving machine is no longer capable of being propelled without damage to the vehicle tracks or damage to the supporting surface.

This rapid wear, deterioration and ultimate failure of the pads is expensive not only by way of replacement costs but also because of costly down time for the equipment during replacement of the worn track pads. The present invention relates to track pad for use with vehicles of the type described above, which pad solves the above related problems. Summary It is the object of the present invention therefore to provide a track pad for tracked vehicles that is more durable and longer lasting.

It is a further object of this invention to provide a track pad for tracked vehicles wherein the pad portion of the device is secured to the structural portion so as to effectively preclude a separation during normal operation.

A still further object of this invention is to provide a method of manufacturing a track pad for tracked vehicles so as to achieve a more durable and longer lasting pad.

These objects and others not enumerated are achieved by a track pad structured in accordance with the present invention, one embodiment of which may include a generally rectangular base plate having a plurality of openings therein, securing means mounted on the base plate, the securing means extending through at least one of the plurality of openings, the securing means for removably attaching the track pad to a track of a tracked vehicle, and pad means comprising a molded thermoplastic urethane elastomer resin member which substantially encapsulates the base plate, the pad means including at least one opening to permit the extension therethrough of at least a portion of the securing means.

Manufacture of such a track pad in accordance with the teachings of the invention may include the steps of inserting the securing member through the opening in the support plate so as to form a sub-assembly, positioning the sub-assembly in a die so that the securing member extends outwardly from the die cavity, securing sub-assembly within the die cavity, injecting pre-heated thermoplastic urethane elastomer resin into the die cavity such as to substantially encapsulate the base plate, but not the securing member, cooling the assembly for a sufficient period of time to permit the thermoplastic urethane elastomer resin to set, and removing the track pad.

BRIEF DESCRIPTION OF THE DRAWINGS

A more complete understanding of the present invention may be had from the following detailed description, particularly when read in light of the accompanying drawings wherein:

FIG. 1 is a plan view of a track pad structured according to the teachings of the invention;

FIG. 2 is a cross-sectional, elevational view through the plane 2—2 of FIG. 1;

FIG. 3 is a cross-sectional, elevational view, similar to the view in FIG. 2, but showing the track pad of the invention contained within a die in which the pad material has been molded around the structural base plate of the pad during manufacture;

FIG. 4 is a view of the track pad of the present invention showing the pad surface i.e. the surface opposite to that shown in FIG. 1 which contacts the vehicle support surface, e.g. the ground;

FIG. 5 is view similar to the view of FIG. 4 but showing a second embodiment of the track pad according to the invention;

FIG. 6 is a cross-sectional, elevational view through plane 6—6 of FIG. 5;

FIG. 7 is a plan view similar to the view of FIG. 1 but showing a third embodiment of the track pad according to the present invention;

FIG. 8 is a cross-sectional, elevational view through plane 8—8 of FIG. 7;

FIG. 9 is a cross-sectional, elevational view through plane 9—9 of FIG. 7 and showing the track pad of the present invention in cooperation with a conventional track shoe.

DETAILED DESCRIPTION

Considering therefore FIG. 1 there is shown a track pad structured in accordance with the teaching of the present invention and designated generally by reference numeral 10. As is clear from FIG. 1, track pad 10 is generally rectangular in shape and thus has a longitudinally extending axis which is substantially greater in length than its transverse axis.

Referring also to FIG. 2 it can be seen that track pad 10 includes a base plate 11 which is generally planar and rectangular in shape (FIG. 1). Base plate 11 defines the principal structural support for track pad 10. Formed along one transverse edge of base plate 11 is a raised lip 13 which defines an obtuse angle with generally planar surface 12 of base plate 11. Similarly a raised lip 15 is formed along the opposite transverse edge of base plate 11 which lip also defines an obtuse angle with surface 12. Formed along the longitudinally extending edges of base plate 11 are a pair of raised lips 17 and 19 which form an obtuse angle with planar surface 12 of base plate 11.

Formed to extend through base plate 11 are a plurality of openings. As best can be seen in FIG. 1, such openings include four square openings 21 and a round opening 23. Square openings 21 are adapted to receive therethrough, flat head carriage bolts 25. Each carriage bolt 25 has a square shaped portion 27 on the stem which is identical in cross-sectional configuration to each square opening 21 in base plate 11. Square shaped portions 27 cooperate with openings 21 to preclude rotation of carriage bolts 25. In this regard it should be noted that it is not necessary that the opening be square, but rather only that such openings be nonround and such as to cooperate with the correspondingly nonround portions of the carriage bolts to preclude rotation of the carriage bolts within the plate. The flat head carriage bolts 25 are used to secure the track pad 10 to the track in a manner well known to those skilled in the art.

The circular hole 23 is formed in base plate 11 for the purpose of permitting the free passage therethrough of pad material during manufacture of track pad 10. In this regard, the selection and location of hole 23 may be determined empirically and it is only necessary that sufficient holes are provided, without endangering the structural integrity of the base plate 11, to accommodate the passage of material to all portions of the mold cavity as discussed in greater detail below with respect to the process for manufacturing track pad 10.

Substantially encapsulating the base plate 11 is a molded thermoplastic urethane elastomer resin member 29. As best can be seen in FIG. 1, the encapsulation of base plate 11 is complete except for the annular areas 31 which circumscribe the stem of each flat head carriage bolt 25. Circular areas 32 and 33 are formed during the manufacture of track pad 10 as is more fully discussed below. A thermoplastic urethane elastomer resin member 29 exhibits increased abrasion resistance and tensile strength over material currently used in the arts and it should be noted that Mobay D-591A as manufactured by the Mobay Chemical Company or equivalents thereof is satisfactory for use as the molded thermoplastic urethane elastomer resin.

A method for manufacturing track pad 10 is best described with reference to FIG. 3 wherein there is shown a molding die having substantially complete track pad therein.

The molding die comprises a lower die half 35 and an upper die half 37. Lower die half 35 is provided with a plurality of circular openings 39 formed therethrough which openings are spaced to accommodate the free passage therethrough of the stems flat head carriage bolts 25. Circular openings 39 are circumscribed by annular projections 41. Projections 41 are of proper length to establish surface to surface contact with base plate 11 such as to assist in maintaining base plate 11 in a desired position during encapsulation.

The upper die half 37 of the molding die is provided with an opening 43 to permit the injection therethrough of heated pad material once the die halves 35 and 37 are secured together.

A plurality of conical projections 45 depend from the cavity surface of upper die half 37. Projections 45 are of proper length to establish surface to surface contact with the surface 12 of base plate 11 such as to cooperate with projections to maintain base plate 11 in proper position during the molding process.

Similarly a plurality of conical projections 47 are formed on the die cavity surface of lower die half 35. Projections 47 are of the proper length to establish surface to surface contact with base plate 11 such as to cooperate with projection 41 and 45 to maintain base plate 11 in proper position during the molding process.

In manufacturing track pad 10, flat head carriage bolts 25 and base plate 11 are pre-assembled by inserting carriage bolts 25 through openings 21. The preassembly is then positioned in the lower die half 35 of the molding die. The lower die half 35 of the molding die is then secured to the upper die half 37 such that the inner surface of die halfs 35 and 37 cooperate to define a space 29 which conforms in configuration to the desired shape of the pad member of track pad 10.

Once the preassembly is secured within die half 35 and 37, liquid thermoplastic urethane elastomer resin is injected into the die cavity through opening 43. Circular hole 23 in base plate 11 aids in permitting the thermoplastic urethane elastomer resin to circulate within the die thus insuring the substantially total encapsulation of base plate 11.

After a sufficient cooling period (which can be determined readily by those skilled in these arts) die half 35 and 37 are separated and track pad 10 is removed. Conical projections 45 depending from the cavity surface of the upper die half leave conical impressions 33 in thermoplastic urethane elastomer resin member 29 on the bottom of track pad 10 as best can be seen in FIG. 4. Conical projections 47 formed on the cavity surface of lower die half 37 also leave conical impressions 32 in thermoplastic urethane elastomer resin member 29 on the top of track pad 10 as best can be seen in FIG. 1.

Referring to FIG. 5, a second embodiment of the present invention is shown and designated generally by reference numeral 110. As is clear from FIG. 5, track pad 110 is generally rectangular in shape and thus has a longitudinally extending axis which is substantially greater in length than its transverse axis.

Referring to FIG. 6 it can be seen that track pad 110 includes a base plate 111 which is generally planar and rectangular in shape (FIG. 5). Base plate 111 defines the principal structural support for track pad 110. Formed along one longitudinal edge of base plate 111 is a raised lip 117 which defines an acute angle with generally planar surface 112 of base plate 111. Similarly a raised lip 119 is formed along the opposite longitudinal edge of base plate 111 which lip also defines an acute angle with surface 112.

Formed to extend through base plate 111 are a plurality of openings. As best can be seen in FIG. 5, such openings include four square openings 121 and a round opening 123. Square openings 121 are adapted to receive therethrough flat head carriage bolts 125. Each carriage bolt 125 has a square shaped portion 127 on the stem which is substantially identical in cross-sectional configuration to each square opening 121 in base plate 111. Square shaped portions 127 cooperate with openings 121 to preclude rotation of carriage bolts 125. In this regard it should be noted that it is not necessary that the openings be square, but rather only that such openings be non-round such as to cooperate with correspondingly non-round portions of the carriage bolts to preclude rotation of the carriage bolts within the plate. The flat head carriage bolts are used to secure track pad 110 to the track in a manner well known to those skilled in the arts.

The circular hole 123 is formed in base plate 111 for the purpose of permitting free passage therethrough of pad material during manufacture of track pad 110. In this regard, the selection and location of hole 123 may be determined empirically, more than a single hole being permissable if required, and it is only that sufficient holes are provided without endangering the structural integrity of base plate 111, to accommodate the passage of material to all portions of the mold cavity as discussed beforehand with respect to the process for manufacture of track pad 110.

Substantially encapsulating base plate 111 is a molded thermoplastic urethane elastomer resin member 129. As best can be seen in FIG. 5, the encapsulation of base plate 111 is complete except for annular areas 131 which circumscribe the stem of each flat head carriage bolt 125. Circular areas 132 and 133, formed during the manufacture of track pad 110, are also not encapsulated as was discussed above with respect to holes 32 and 33 what are formed during the manufacture of track pad 10.

In this regard, the method for manufacturing track pad 110 is identical to the manufacture of track pad 10 which has been discussed previously.

Referring to FIG. 7, a third embodiment of the present invention is shown and designated generally by reference numeral 210. As is clear from FIG. 7, track pad 210 is generally rectangular in shape and thus has a longitudinally extending axis which is substantially greater in length than its transverse axis.

Referring also to FIG. 8, it can be seen that track pad 210 includes a base plate 211 which is generally planar and rectangular in shape (FIG. 7). Base plate 211 defines the principal structural support for track pad 210. Formed along one longitudinal edge of base plate 211 is a raised lip 217 which defines an acute angle with generally planar surface 212 of base plate 211. Similarly a raised lip 219 is formed along the opposite longitudinal edge of base plate 211 which lip alsos defines an acute angle with surface 212.

Planar surface 212 of base plate 211 is interrupted by circular indentations 251. These circular indentations 251 are made during the manufacturing of base plate 211 and cause dimples 253 to protrude from planar surface 214 which is opposite planar surface 212. The purpose of dimples 253 will be more fully explained with respect to FIG. 9.

Formed to extend through base plate 211 are a plurality of openings. As best can be seen in FIG. 7, such openings include four square openings 221 and a round opening 223. Square openings 221 are adapted to receive therethrough flat head carriage bolts 225. Each carriage bolt 225 has a square shaped portion 227 on the stem which is identical in cross-sectional configuration to each square shaped opening 221 in base plate 211. Square shaped portions 227 cooperate with openings 221 to preclude rotation of carriage bolts 225. In this regard it should be noted that it is not necessary that the openings be square, but rather only that such openings be non-round so as to cooperate with the carriage bolts to preclude rotation of the carriage bolts within the plate. The flat head carriage bolts are used to secure track pad 210 to the track in a manner well known to those skilled in the art.

The circular hole 223 is formed in base plate 211 for the purpose of permitting free passage therethrough of pad material during the manufacture of track pad 210. In this regard the selection and location of hole 223 may be determined empirically and it is only that sufficient holes are provided without endangering the structural integrity of base plate 211, to accomodate the passage of pad material to all portions of the die cavity as discussed previously with respect to the manufacture of track pad 10.

Substantially encapsulating base plate 211 is a molded thermoplastic urethane elastomer resin meter 229. As best can be seen from FIG. 7, the encapsulation of base plate 211 is complete except for annular areas 231 which circumscribe the stem of each flat head carriage bolt 225. Circular areas 232 and 233 are formed during the manufacture of track pad 210 are also not encapsulated and were discussed previously with respect to the manufacture of track pad 10. Dimples 253 which protrude from planar surface 214 of base plate 211 are substantially encapsulated by the thermoplastic urethane elastomer resin member 229, the surface of member 229 being substantially tangential to the outermost surface of dimples 253.

Referring to FIG. 9 there is shown a cross-sectional, elevational view of track pad 210 through plane 9—9 of FIG. 7. Track pad 210 is shown in frictional relation to a conventional track shoe 260 of an asphalt paving machine. As can be seen, track shoe 260 includes circular openings 261 which permit the passage therethrough of carriage bolts 225. Track shoe 260 also includes support ribs 263 and 264 which contact track pad 210 at its transverse ends when it is secured in position. Track shoe 260 also includes support rib 265 which contacts track pad 210 approximately midway between the transverse edges and also support ribs 267 which contact track pad 210 between carriage bolts 225.

The raised lips along the longitudinal edges of base plate 211 in cooperation with the substantial encapsulation of base plate 211 with thermoplastic urethane elastomer resin member 229 effectively solves the vexing problem of separation of pad material from the base plate during the operation of the tracked vehicle. However, since the thickness of pad material on planar surface 214 is now substantially greater than on track pads previously known in the art, difficulty may occur in maintaining contact with the track shoe along the transverse and longitudinal edges of track pad 210.

This problem may arise when the track pad is torque securely to the track shoe. Support ribs 267 may penetrate the thermoplastic urethane elastomer resin surface, causing the track pad 210 to pivot about support rib 265 and thus lose contact with support rib 264. This embodiment of the invention effectively solves this problem by means of protruding dimples 253.

When track pad 210 is secured in position, the outer surfaces of dimples 253, make surface-to-surface contact with support ribs 267 of track shoe 260.

This surface-to-surface bearing contact, of base plate 211 and track shoe 260 prevents track pad 210 from pivoting on support rib 265 during the process of torqueing down carriage bolts 225 and thus prevents track pad 210 from loosing contact with support rib 264.

Although three embodiments of track pad according to the invention have been disclosed and described in detail, it will be recognized by those skilled in these arts that modified track pad structures may be designed which do not depart from the spirit and teachings of the present invention.

What is claimed is:

1. A method for manufacturing a track pad for a tracked vehicles said track pad having a generally planar rectangular base plate with a plurality of openings, a securing means extending through at least one of said plurality of openings for removably attaching the track pad to a track of said tracked vehicles and a pad means of polymer substantially totally encapsulating said base plate but which includes at least one openings to permit the extension therethrough of a portion of said securing means, comprising:
    positioning said securing means in said support plate to form a sub-assembly
    positioning said sub-assembly within a die wherein said securing means extend from the die cavity and as such, avoids encapsulation by said polymer;
    securing said sub-assembly within said die by means of a plurality of positioning projections which extend from said inner surface of said die into said die cavity making surface to surface contact with said base plate
    injecting polymer into said die to fill said space between said inner surface of said die and said base plate;
    maintaining said die in a closed position for sufficient time to permit setting of said polymer material
    removing said track pad from said die after setting of said polymer.

2. A track pad for tracked vehicles comprising:
    a generally rectangular base plate, said base plate including first and second generally longitudinally extending edges and first and second generally transversely extending edges wherein each of said first and second longitudinally extending edges is provided with a raised lip formed thereon;
    securing means mounted on said base plate, said securing means for removably attaching said track pad to a track of a tracked vehicle; and
    pad means, said pad means comprising a molded polymer member which substantially totally encapsulates said base plate, said pad means including at least one opening to permit the extension therethrough of at least a portion of said securing means.

3. A track pad according to claim 2 including a plurality of openings formed in said base plate, and wherein said securing means extends through at least one of said plurality of openings.

4. A track pad according to claim 2 wherein said base plate includes a first generally planar surface and wherein each said raised lip is formed to cooperate with said first planar surface to define an acute angle.

5. A track pad according to claim 2 wherein said base plate includes a first generally planar surface and wherein each said raised lip is formed to cooperate with said first planar surface to define an obtuse angle.

6. A track pad according to claim 5 including a first and second transversely extending raised lip formed on said first and second transversely extending edge of said base plate respectively, each said transversely extending raised lip cooperating with said first planar surface to define an obtuse angle.

7. A track pad for tracked vehicles comprising:
    a generally rectangular base plate, said base plate having a first generally planar surface and a second generally planar surface;
    securing means mounted on said base plate, said securing means for removably attaching said track pad to a track of a tracked vehicle;
    pad means, said pad means comprising a molded polymer member which substantially totally encapsulates said base plate, said pad means including at least one opening to permit the extension therethrough of at least a portion of said securing means; and
    reaction means comprising at least one raised surface extending outwardly from said second generally planar surface and disposed substantially adjacent said securing means such that said raised surface contacts the surface of a track shoe to define a reaction surface between said track shoe and said track pad.

8. A track pad according to claim 7 wherein said base plate includes first and second generally longitudinally extending edges and first and second generally transversely extending edges and wherein each of said first and second longitudinally extending edges is provided with a raised lip formed thereon.

9. A track pad according to claim 8 wherein said first generally planar surface cooperates with each said raised lip to define an acute angle.

10. A track pad according to claim 8 wherein said first generally planar surface cooperates with each said raised lip to define an obtuse angle.

11. A track pad according to claim 10 including first and second raised lips formed on said first and second transversely extending edges of said base plate respectively, each said raised lip cooperating with said first planar surface to define an obtuse angle.

12. A track pad according to claim 7 wherein said at least one raised surface defining said reaction means extends outwardly of said second generally planar surface such as to cause the surface of said pad means to be coplanar to the outermost surface of said reaction means.

13. A track pad according to claim 7 wherein each said raised surface is defined by a dimple formed in said base plate.

14. A track pad according to claim 12 wherein each said raised surface is defined by a dimple formed in said base plate, the outer curvature of each said dimple being tangential to the surface of said pad means.

* * * * *